UNITED STATES PATENT OFFICE.

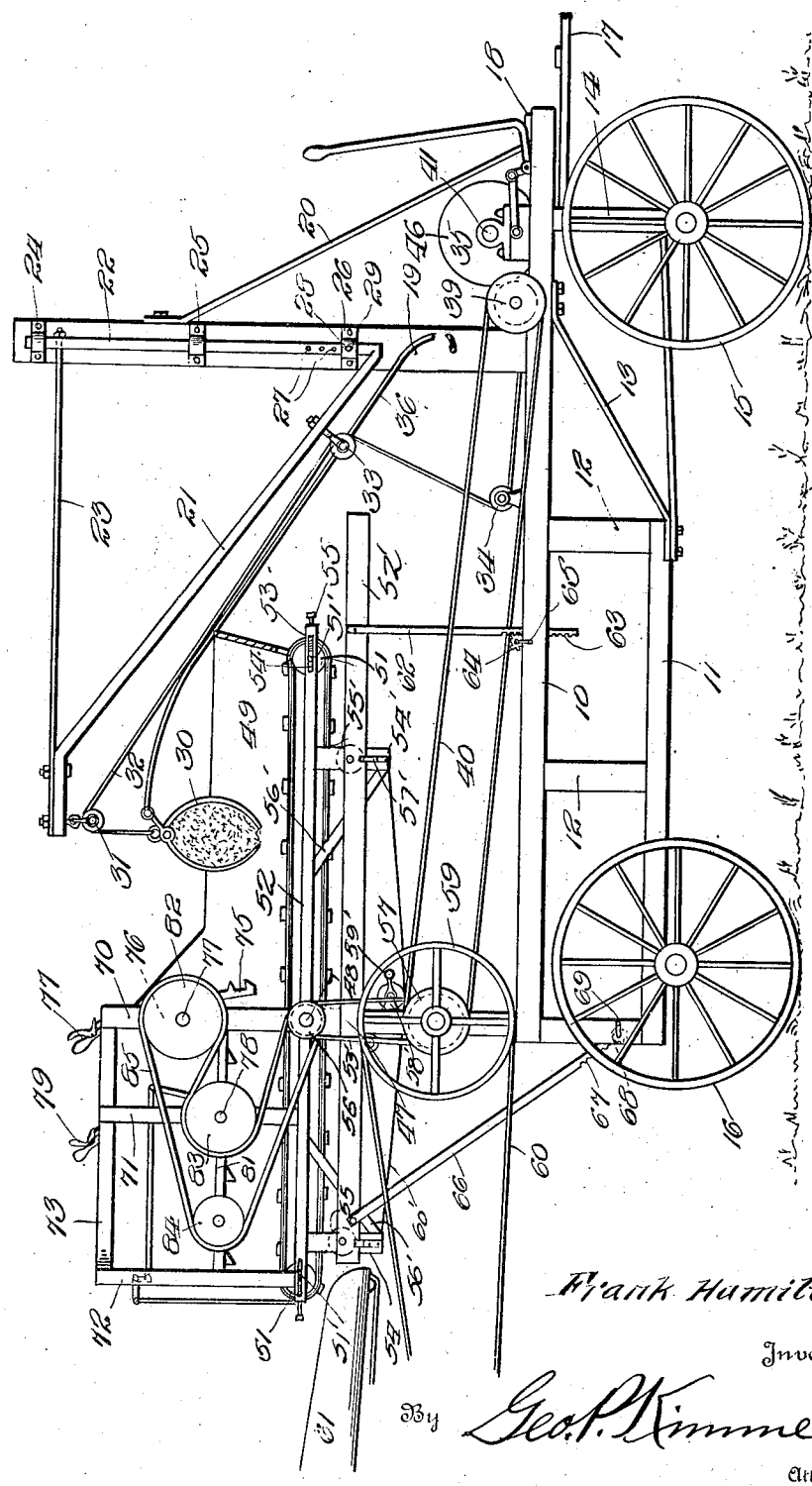

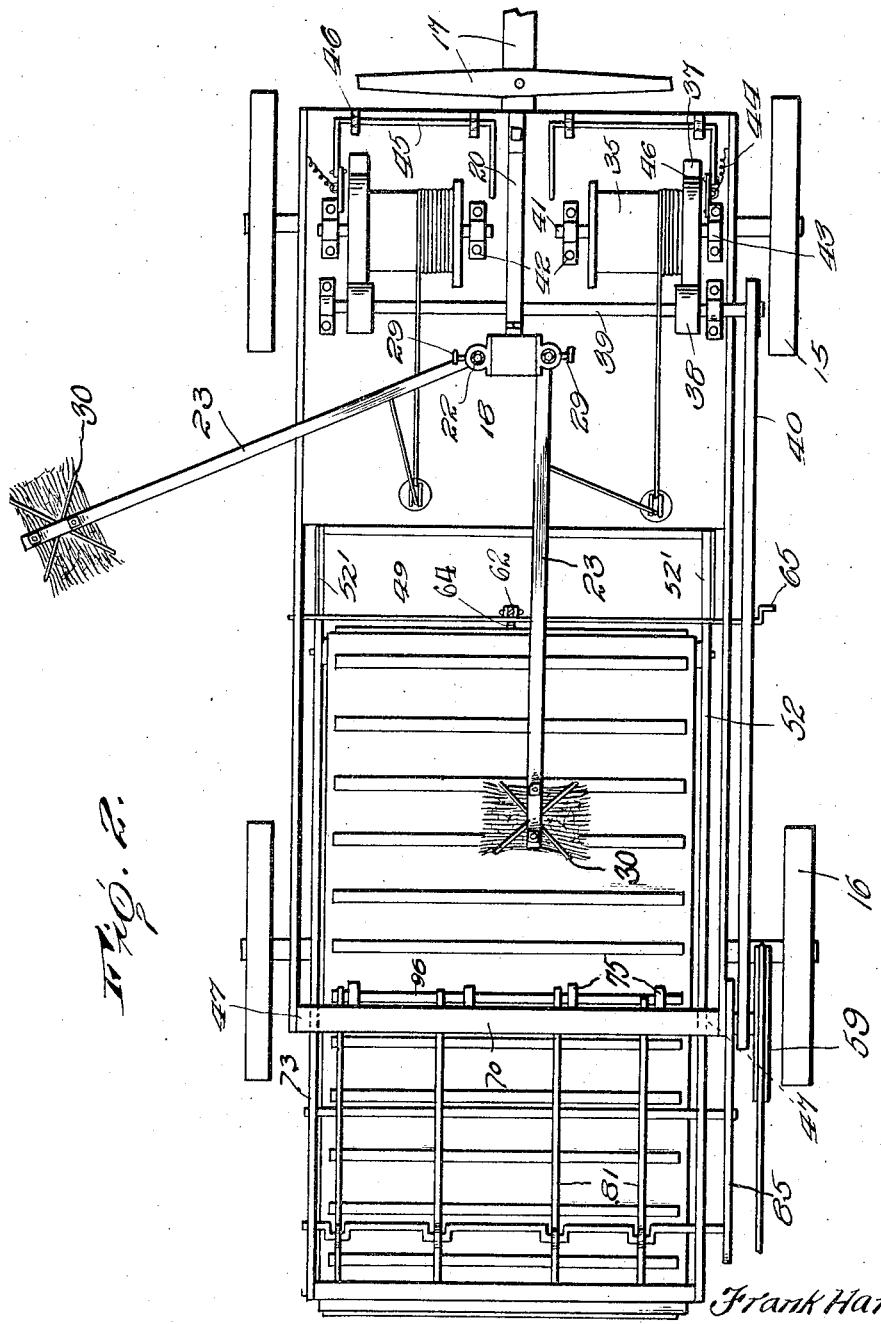

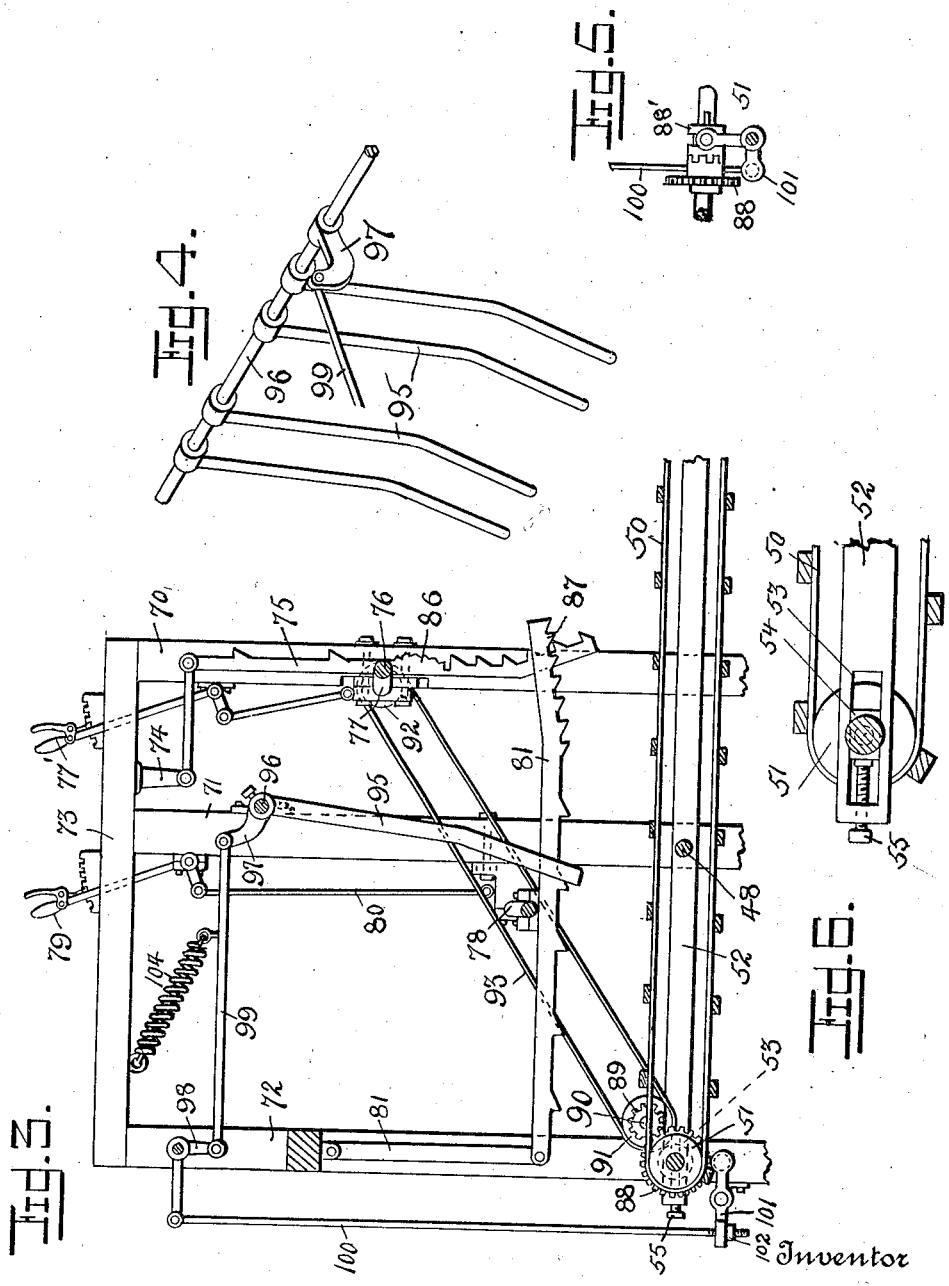

FRANK HAMILTON, OF BURLINGTON, OKLAHOMA.

SELF FEEDING AND PITCHING MACHINE.

1,351,381.  Specification of Letters Patent.  Patented Aug. 31, 1920.

Application filed July 2, 1918. Serial No. 243,031.

*To all whom it may concern:*

Be it known that I, FRANK HAMILTON, a citizen of the United States, residing at Burlington, in the county of Alfalfa and State of Oklahoma, have invented certain new and useful Improvements in Self Feeding and Pitching Machines, of which the following is a specification.

My invention has special reference to the class of threshing and more particularly to feeding devices for threshing machines, the specific purpose of the invention being to provide a self feeding and pitching machine which is adapted to stand in between the stacks of grain and the threshing machine and deliver the bundles or gavels of grain in the proper quantity to the feeder of the threshing mechanism at the receiving end of the thresher, whereby the bundles of grain will be expeditiously supplied to the feed table of the thresher.

A further object of the invention is to provide an improved device of the character set forth, in which there is combined in one transportable machine, adapted to be placed in juxtaposition to the thresher at the receiving end of the latter, a pitching mechanism including derricks provided with loading forks both under the control of an operator and capable of independent manipulation so that each derrick is adapted to grasp a large shock or bunch of grain and to elevate and drop it onto a feeding device so constructed as to control and regulate automatically the feeding of the grain to the threshing mechanism.

A further object of the invention is to provide a mechanism which can be driven from the thresher, and which in addition, includes means associated with the mechanism whereby the operation of the latter is automatically stopped should too large a bunch of straw or grain be fed into the hopper of the feeding device. In this manner the shock will be prevented from being fed into the threshing machine at too great a rate such as would tend to clog the same. The device also operates to automatically put in motion the feeding device after the shock has been broken up and divided so as to supply a normal quantity of grain to the thresher to be acted upon therein.

A still further object of the invention is to provide means whereby the feeding mechanism can be moved forwardly on the wheeled frame, so as to prevent the latter from projecting from beyond the vehicle when the device is not being used, and when transporting the same from place to place, so that the load will be removed from the rear of the machine and distributed upon the center of the frame, so that the weight will be equally proportioned.

With the above objects and others in view, as will appear as the description proceeds, the invention comprises the various novel features of construction and arrangement of parts which will be more fully described hereinafter and set forth with particularity in the claims appended hereto.

Reference is had to the accompanying drawings, forming a part of this application, in which like reference characters indicate corresponding parts throughout the several views, and wherein—

Figure 1 is a side elevation partly in section of my improved self feeding and pitching machine showing its relation to a thresher as in operation, Fig. 2 is a plan view thereof showing one of the loading devices swung out to take a shock or bundle of grain, while the other device is in position to discharge the same upon the feeding mechanism, Fig. 3 is an enlarged fragmentary vertical sectional view showing the shock loosening or disintegrating mechanism and means for automatically stopping and starting the feeding means or endless carrier, Fig. 4 is a detailed perspective view showing one of the forks constituting a part of the automatic stopping and starting means of the feeding mechanism.

Fig. 5 is a detail of the clutch.

Fig. 6 is an enlarged detail of one of the carrier belt tighteners partly in section.

Referring to the drawings in detail, my improved self-feeding and pitching machine is shown in the form of a wheeled vehicle including a suitable supporting frame or carriage, comprising the main sills 10 of the frame, and a sub-sill 11 having connection therewith through the medium of the uprights 12 and braced thereto on the forward end of the machine as shown at 13. At the front of the machine there is provided a suitably braced front axle support 14, the entire frame being supported upon front transporting wheels 15 and rear transporting wheels 16, the front wheels adapted to be turned for guiding the frame in the usual manner. Suitable draft means are provided for transporting the vehicle, and while I have shown the usual tongue and whiffle tree mechanism 17, for hitching draft animals thereto, it is obvious that the device may be transported by a tractor or otherwise.

Arranged upon the front of the wheeled frame is a platform 18, upon which there is supported a vertical standard 19 braced to the platform as shown at 20, such beam comprising part of a derrick construction, which further includes a pair of angularly disposed booms or arms 21 having vertical pivot portions 22 connected by brace arms 23 at their upper ends to the outer and upper ends of the booms 21. These devices are mounted on opposite sides of the vertical standard 19 so as to be swung inwardly and outwardly with respect to both sides of the machine, so as to reach out to load the shock or bundles of grain from both sides and to discharge the same upon the feeding mechanism, as will be hereinafter more fully set forth.

The vertical pivot portion 22 of each derrick or boom is adapted to swing in an upper bearing 24, an intermediate bearing 25 and a lower bearing 26 therebeneath, all of said bearings being mounted on the vertical standard 19 in substantially equidistantly spaced relation, while the lower bearing 26 is spaced above the lower end of said standard and consequently with respect to the platform 18. The booms may be raised to operative positions or lowered to inoperative positions, as desired, and for this purpose the brace arms 23 are located slightly below the upper bearings 24 of the pivot portions 22 so that the members 22 may be raised or lowered without interference from the brace arms. The members 22 are each provided with a plurality of apertures 27 to receive pin 29 to hold the members 22 in elevated or operative position and at the same time rotative in the bearings 24, 25 and 26. When it is desired to lower the boom at either side of the standard the pin 29 is removed and this will allow the pivot member 22 to drop to the bottom of the standard 19 upon the platform 18. The derrick device may thus be disposed in inoperative positions.

Suspended from the free end of each boom is a hay fork 30, the same being the usual snatch fork having jaws of opposed swinging tines suspended from a pulley 31 through the medium of a rope or cable 32 which is passed over the pulley and the opposite end thereof extended along the boom and over a pulley 33 carried by the boom adjacent to the standard 19, the cable or rope being subsequently passed under a swiveled pulley 34 carried upon the platform 18 and then wound upon a drum 35 also arranged upon the platform adjacent to the forward end of the vehicle. This mechanism is duplicated for each of the booms at the opposite sides of the vertical standard and a release rope or cable 36 is connected to each snatch fork or hay fork at each side, so that the latter can be released of its load when desired. I have shown the release rope broken away to show that it may be extended to an indefinite length to allow for raising and lowering the fork, as the cable or rope 32 is unwound from the drum or wound upon the same as will now be described.

Each drum 35 is provided with a relatively wide rim 37 producing a friction pulley adapted to be engaged by a friction wheel 38 fixed upon a shaft 39 mounted transversely upon the platform 18, adjacent to the drum, and carrying upon one end a grooved pulley or sprocket 39 by which it may be driven through the medium of an endless drive member or belt 40 from the thresher mechanism, as will be subsequently set forth. The drum shafts 41 are journaled in bearings 42 at their inner ends and at their outer ends said shafts are mounted in sliding bearings 43 whereby the rims 37 of the drums may be moved into frictional engagement with the friction wheels 38 for imparting rotation to the drums for the purpose of winding the cables thereon in elevating the shocks caught by the hay forks 30. The sliding bearings 43 are operated through the medium of levers 45 and coupling links 45', and held normally at one end of the paths of the friction surfaces and out of contact by contractile springs 44, as shown. The levers 45 are extended inwardly across the platform to the center portion thereof between the respective drums so as to permit of their convenient manipulation by a single operator. As before mentioned, when the shocks or bundles are being raised, the friction rims of the drums are in engagement with the friction wheels but when the snatch hooks or hay forks are being lowered to receive a shock or bundle standing on the ground, the levers 45 are released and the springs 44 act to disengage the friction rims of the drums from the friction wheels 38, thus permitting the cables to be unwound to the proper length. This is facilitated by disposing brake shoes 46 adjacent to the friction rims of the drums and each operative by a lever 46' so that when the latter are acted upon by the disengaging means constituted by the springs 44, the brake shoes may be engaged with the friction rims of the drum to retard the retrograde movement of the drums to control the unwinding of the cables.

Arranged at the rear end of the wheeled frame is an upright cross frame 47 receiving between the side portions thereof on a horizontal shaft 48, a hopper 49 discharging toward the open bottom thereof on to an endless carrier belt 50, which carrier belt operates around end rollers 51 journaled in the carrier frame 52. In order to slacken or tighten the endless carrier, the end portions of the sides of the frame 52 are provided with longitudinal slots 53 in which the bearings 54 are slidable, suitable adjusting screws 55 being disposed in the ends of the frame for shifting the bearings and consequently the rollers 51, thus permitting the endless carrier or belt to be made as taut as desired or found necessary.

Also fixed to the shaft 48 is a double grooved pulley 56, and journaled in the upright frame 47 therebeneath is a larger grooved pulley 57 of double formation, and around one grooved portion of which and the pulley 56 an endless belt 58 is engaged, while an endless belt 40 is engaged around the other part of the pulley 57 and around a pulley 39' on the shaft 39 of the friction pinion 38. A large belt pulley 59 is also journaled on the same shaft with the pulley 57 and rotates therewith, said large pulley acting as a fly wheel and having an endless drive belt 60 engaged thereon and extended to be engaged around a pulley of the threshing machine (not shown). A portion of the feed table of the threshing machine is shown in Fig. 1 of the drawings at 61. This is the receiving hopper and conveyer at the feed end of the thresher adjacent to which the present machine is positioned so as to feed the grain thereon, in proper quantity and at a steady and even stream, as heretofore mentioned.

Furthermore, inasmuch as the machine is positioned between the shocks or bundles and the thresher, and is transported from place to place, it is necessary to adjust the feeder, including the hopper and endless conveyer, so that the discharge end of the conveyer 50 will be disposed in proper juxtaposition with respect to the thresher, and for this purpose adjustable means are provided at the forward and rear ends of the conveyer frame. This adjusting means comprises a standard or prop 62 pivoted to the forward end of a supporting frame 52' pivoted at 53' on the upright 47 and having formed on its lower portion, a series of rack teeth 63 engageable by a pinion 64 capable of rotation through the medium of a crank handle 65, the latter being adapted to be locked in adjusted position so that the prop can be held when adjusted. At the rear end of the frame there is provided a brace 66 pivoted to the rear portion of the frame 52' and extending diagonally or obliquely forwardly to the rear end of the transporting frame, where it is provided with rack teeth 67 engaged by a pinion 68 operable by a crank handle 69 for projecting or retracting the brace whereby the latter will coöperate with the prop 62 in holding the conveyer frame, together with the hopper and conveyer carried thereby, at the proper inclination or angularly adjusted position. The supporting frame 52' comprises in its construction, spaced side members or tracks 70 of L-shaped construction, upon which the conveyer frame 52 is supported for horizontal movement or adjustment longitudinally of the wheeled frame or vehicle, the conveyer frame being provided for this purpose, at opposite sides, with depending spaced supports 54' having flanged or car-like wheels 55' journaled at the inner sides thereof, and running on the horizontal portions or flanges of the tracks. These supports 54' are braced to the conveyer frame as shown at 56' and stop members 57' are provided to prevent displacement of the wheels with respect to the tracks, by engagement with the inner sides of the flanges, said stops 57' being arranged upon the supports 54'. A windlass 58' is journaled in the upright frame 47 and has an operating handle 59', while intermediately wound on said windlass is a cable 60', the opposite extremities thereof being connected to the opposite ends of the carrier frame through the medium of the supports or hangers 54', so that upon operating the windlass the cable will be oppositely wound for shifting the endless conveyer forwardly or rearwardly so that when the device is in use it may be projected rearwardly over the feed hopper and conveyer of the thresher, or forwardly so as to balance the vehicle when the device is being transported from place to place. In this connection, it should be noted that sufficient space is allowed between the derrick mechanism and feed mechanism, to allow for the adjustment described. It will be noted from Fig. 1 of the drawing that the rear end of the conveyer projects slightly over the feed hopper and conveyer of the thresher so that the grain will be discharged thereon.

Arranged upon the rear portion of the frame 52 is a rectangular frame construction comprising spaced side members or uprights 70 contiguous to the upright frame 47, intermediate side members 71 and rear side members 72 all connected to the frame 52 at their lower ends and connected to each other at their upper ends by longitudinal frame members 73. Suspended from the upper longitudinal frame members 73 are a plurality of hangers 74, preferably four in number, and adapted to pivotally support a similar number of depending toothed tines 75 connected intermediate of their ends to the crank portion 76 of a shaft 77, which latter shaft is journaled in the uprights 70 forming the side members of the rectangular frame or superstructure mounted upon the conveyer frame and designed to be raised and lower thereon through the medium of a throw lever 77' so as to raise the fork and vary the distance between the lower end thereof and the conveyer during the oscillatory reciprocation of the fork. In this manner, the quantity of the grain fed beneath the fork can be efficiently regulated.

Similarly journaled for vertical adjustment on the intermediate side members 71 is a crank shaft 78, said crank shaft having connection with a throw lever 79 supported upon the top of the frame similarly to the manner in which the throw lever 77' is supported, except that the throw lever 79 has connection with the crank shaft 78 through the medium of a connecting rod 80, thereby permitting the crank shaft 78 to be raised and lowered and held in adjusted position in the same manner as the crank shaft 77. A plurality of toothed tines 81 with the teeth thereof projecting rearwardly, are engaged with the crank portions of the shaft 78, thereby producing a horizontally positioned fork, which in contradistinction to the fork produced by the tines 75, acts as a shaker or agitator to prevent the material from passing beyond a predetermined quantity, acts to feed the material which passes under the fork, to discharge said material or grain from the rear of the hopper and conveyer as it is carried along by the latter. The rear ends of the tines 81 are pivotally suspended through the medium of hangers 81' which latter are suspended for swinging movement with the tines. Mounted upon the shaft 77 is a pulley or sprocket 82 and mounted upon the shaft 78 is a pulley or sprocket wheel 83, while journaled upon a suitable bracket is an idler pulley or sprocket 84 resiliently held rearwardly to serve as a belt tightener for an endless drive belt or chain 85 engaged over the pulley 82 and under the same, and then over the sprocket wheel 83 and then over the double sprocket wheel or pulley 56 mounted upon the shaft 48 and finally around the idler pulley 84, thus imparting opposite rotation to the respective shafts 77 and 78 to give forward reciprocating movement to the repelling fork and rearward reciprocating movement to the feeding fork as the shaft 48 is rotated through the medium of the belt 58.

The repelling fork 75 is provided with a series of sickle teeth 86 and the feeding fork 81 is provided with similar sickle teeth 87, these teeth serving to cut the bands as the bundles of grain are fed through the machine.

Fixed to one end of the shaft of the rear roller 51 is a gear 88, and disposed in mesh with the gear 88 is a gear 89 suitably journaled on a shaft 90, which shaft carries a sprocket wheel 91 around which and a sprocket wheel 92, mounted on one end of the shaft 77, an endless drive chain 93 is engaged, so that when the shaft 77 is rotated, rotation will be imparted to the endless conveyer or carrier belt. Pivotally supported in the intermediate side members 71 above the shaft 78 is a governor fork, the latter consisting of a plurality of angular tines 95 suspended from a pivot 96 engaged with the opposite side members 71 and having fixed thereto an arm 97, which arm has connection with a pivoted bell crank lever 98 suspended between the rear side members 72 for pivotal action as is clearly shown in Fig. 3, through the medium of a connecting rod 99. One arm of the bell crank lever 98 extends forwardly and the other downwardly for connection with the rod 99, while the remaining arm extends rearwardly and has connection with an adjustable rod 100. At its lower end the rod 100 is coupled adjustably at one end to a pivoted lever 101 by means of an adjusting nut 102, the other end of the lever 101 being adapted to engage the movable part 88' of a clutch member mounted on the same shaft with the rear roller 51 and the gear 88, so that when the lever 101 is actuated the clutch will be disengaged and the gear will be released and run idle thereby stopping the transmission of motion and preventing further feeding. Suitable means is also provided for holding the governor fork with its free lower end forwardly disposed, and as shown, such means is in the form of a retractile coiled spring 104 connected to the rod 99 and to the top portion 73 of the frame structure carried by the conveyer frame, this spring exerting rearward tension on the rod 99 to hold the governor fork yieldably in position for the purpose hereafter specified.

In the operation of the machine three operators are required, one being positioned upon the platform 18 to operate the levers 45 controlling the winding drums of the derrick, while the other two operate the forks and swing the booms away from the vehicle and conveyer at the side, or over the same. Preferably, while one of the forks is being lowered to take a shock or bundle of grain in its hay fork, the other boom is positioned over the hopper to discharge its load, the booms being swung on their pivots to accomplish this action and the forks being released through the medium of the release ropes 36. It has already been explained how the booms may be moved into and out of operative position, and, therefore, no further description thereof will be given.

However, upon the grain being discharged into the hopper 49 and upon the endless conveyer, the grain is carried rearwardly and during the oscillatory reciprocation of the repelling fork 75, if the bundle or shock is too large to pass beneath the same, the grain is separated and disintegrated so as to pass therebeneath and to be fed rearwardly during the oscillatory reciprocation of the feeding member or shaker 81, the grain being finally discharged at the rear end of the conveyer and on to the feeding mechanism of the thresher. However, should a large bunch of grain pass by the repelling fork 75, it will strike the governor fork 95, and in so doing will push it to the rear so as to cause downward movement of the rod 100, thereby actuating the clutch and releasing the endless carrier or conveyer belt. When the grain has been thinned out and is feeding properly, the spring 104 will serve to return the governor fork to its original position for normal operation of the feeding mechanism. By this means it is assured that a proper quantity of grain be discharged into the thresher there to be operated on for separating the straw from the chaff and prevented from being fed into the threshing machine at too great a rate such as would tend to clog the same. In order to increase the capacity of the machine, the crank shafts 77 and 78 are elevated through the medium of the throw levers 77' and 79 respectively, thereby permitting a greater quantity of the grain to be fed and discharged by the device. In order to decrease the capacity of the machine, the throw levers 77' and 79 are operated to lower the crank shafts 77 and 78 so that the quantity of grain passing therebeneath is reduced.

From the foregoing description taken in connection with the accompanying drawings, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having fully described my invention, what I claim as new and desire to secure by Letters Patent of the United States, is:

1. In an apparatus of the class described, a receptacle, a conveyer device forming the bottom of said receptacle, a fork device substantially at right angles to the conveyer device, means for moving said fork device vertically and horizontally to move the contents of the receptacle toward the conveyer device, another fork device substantially in parallel relation to the conveyer device, means for moving said last mentioned fork device horizontally and vertically to move the contents of the receptacle longitudinally of the conveyer device.

2. In an apparatus of the class described, a receptacle, a conveyer device forming the bottom of said receptacle, a fork device substantially at right angles to the conveyer device, means for moving said fork device vertically and horizontally to move the contents of the receptacle toward the conveyer device, another fork device substantially in parallel relation to the conveyer device, for moving said last mentioned fork device horizontally and vertically to feed the contents of the receptacle longitudinally of the conveyer device, a governor device extending into the path of the material moved by the conveyer device, means for operating said conveyer device, and means between the governor device and the conveyer operating means whereby a predetermined position of the governor device will cause the conveyer operating means to be disposed in inoperative position.

3. In an apparatus of the class described, the combination with a conveyer device, of a feeding fork device substantially at right angles to the conveyer device, means for moving said feeding fork device vertically and horizontally, and another feeding fork device coöperating with the first mentioned feeding fork device and substantially in parallel relation to the conveyer device, and means for moving said last mentioned feeding fork device vertically and horizontally.

4. In an apparatus of the class described, the combination with a conveyer device, of means for actuating said conveyer device, a feeding fork device, substantially at right angles to the conveyer device, means for moving said feeding fork device horizontally and vertically, another fork device substantially horizontal and in parallel relation to the conveyer device, means for moving said last mentioned device horizontally and vertically, a governor device extending into the path of the material moved by the conveyer device, and means between the conveyer device and the conveyer operating mechanism whereby a predetermined position of the governor will cause the conveyer operating means to be disposed in inoperative position.

5. In an apparatus of the class described, a conveyer device, a crank shaft, a fork device substantially at right angles to the conveyer device, and connected to the cranks of said shaft and movable thereby substantially vertically and horizontally, another crank shaft, and a fork device substantially in parallel relation to the conveyer device and connected to the cranks of said last mentioned shaft and movably horizontal and vertically thereby.

6. In an apparatus of the class described, the combination with a conveyer device, of a feeding fork device substantially at right angles to the conveyer device, means for moving said feeding fork device vertically and horizontally, said feeding fork device, including a plurality of tines, each having laterally directed teeth and a band severing element, another feeding fork device substantially parallel to the conveyer device and coöperating with the first mentioned feeding fork device, and means for moving said last mentioned feeding fork device substantially horizontally and vertically and in constant parallel relation to the conveyer device, said last mentioned feeding fork device including a plurality of tines each having a plurality of teeth and a band severing element.

7. In an apparatus of the class described, a supporting frame, a conveyer frame pivotally supported intermediate its ends, a conveyer carried by said conveyer frame, means for depositing grain upon the conveyer, an auxiliary frame supported upon the conveyer frame, a repelling fork operatively supported upon the auxiliary frame, a feeding fork operatively supported upon said auxiliary frame, means for simultaneously operating said forks, and means for adjusting said forks.

8. In an apparatus of the class described, a supporting frame, a conveyer frame pivotally supported intermediate its ends, a conveyer carried by said pivoted frame relatively to said supporting frame, means for depositing grain upon the conveyer, an auxiliary frame supported upon the conveyer frame, a repelling fork operatively supported upon the auxiliary frame, a feeding fork operatively supported upon the auxiliary frame, means for simultaneously operating said forks, said forks serving to regulate the quantity of the material discharged by the conveyer, and a stopping means including a governor fork for causing the nonoperation of the conveyer.

9. In an apparatus of the class described, a supporting frame, a conveyer frame pivotally supported intermediate of its ends upon said supporting frame, a conveyer carried by the conveyer frame and adapted to receive grain thereon, an auxiliary frame supported upon the conveyer frame, a repelling fork operatively supported upon the auxiliary frame, a feeding fork operatively supported on the auxiliary frame, means for simultaneously operating said forks, said forks serving to regulate the quantity of the material fed to the conveyer, a controlling means including a governor fork for causing the nonoperation of the conveyer, and means for adjusting the repelling and feeding forks vertically to regulate the quantity of grain passing thereunder, said governor device serving to insure uniform feeding of the grain.

10. In an apparatus of the class described, a supporting frame, a conveyer frame pivotally supported intermediate its ends relatively to the supporting frame, a conveyer carried by the conveyer frame and adapted to receive grain thereon, an auxiliary frame supported upon the conveyer frame, a repelling fork operatively supported upon the auxiliary frame, a feeding fork operatively supported on the auxiliary frame, means for simultaneously operating said forks, said forks serving to regulate the quantity of the material fed to the conveyer, a controlling means including a governor fork for causing the nonoperation of the conveyer, means for adjusting the repelling and feeding forks vertically to regulate the quantity of grain passing thereunder, said governor fork serving to insure uniform feeding of the grain, and means for normally holding said governor fork and controlling means in inoperative position, said stop means being adjustable.

11. In an apparatus of the class described, a supporting frame, a carrying frame pivotally supported intermediate the ends upon the supporting frame, a conveyer frame slidably supported on the carrying frame, means for shifting said conveyer frame longitudinally of the carrying frame, a conveyer on the conveyer frame adapted to receive grain thereon, an auxiliary frame supported on the conveyer frame, a repelling fork operatively supported on the auxiliary frame, a feeding fork operatively supported on the auxiliary frame, and means for simultaneously operating said forks.

12. In an apparatus of the class described a transporting device mounted to swing vertically, means for vertically adjusting said transporting device, a conveyer frame movable longitudinally of the transporting frame, a conveyer carried by said conveyer frame, and means for operating said conveyer.

13. In an apparatus of the class described a transporting device mounted to swing vertically, means for vertically adjusting said transporting device, a conveyer frame movable longitudinally of the transporting frame, a conveyer carried by said conveyer frame, means for operating said conveyer, vertically movable repelling forks, longitudinally movable feeding forks, and means for operating said forks.

In testimony whereof I affix my signature hereto.

FRANK HAMILTON.